United States Patent

Juras

[11] Patent Number: 5,297,710
[45] Date of Patent: Mar. 29, 1994

[54] METHOD AND APPARATUS FOR DIVIDING FLAT GLASS PANELS

[75] Inventor: Karl-Heinz Juras, Mainz, Fed. Rep. of Germany

[73] Assignee: Schott Glaswerke, Mainz, Fed. Rep. of Germany

[21] Appl. No.: 914,709

[22] Filed: Jul. 15, 1992

[30] Foreign Application Priority Data

Jul. 19, 1991 [DE] Fed. Rep. of Germany ....... 4123929

[51] Int. Cl.$^5$ .............................................. C03B 33/033
[52] U.S. Cl. ........................................ 225/2; 225/96.5; 225/103
[58] Field of Search .................... 225/2, 96.5, 103, 105

[56] References Cited

U.S. PATENT DOCUMENTS

| | | | |
|---|---|---|---|
| 4,131,222 | 12/1978 | Hodgkinson | 225/3 |
| 4,140,258 | 2/1979 | Gray | 225/2 |
| 4,171,895 | 9/1984 | Lisec, Jr. | 225/2 |
| 4,278,193 | 7/1981 | Pereman et al. | 225/2 |
| 4,698,088 | 10/1987 | Bando | 65/174 |

FOREIGN PATENT DOCUMENTS

| | | | |
|---|---|---|---|
| 782921 | 4/1968 | Canada | 225/105 |
| 2742520 | 3/1978 | Fed. Rep. of Germany. | |
| 3230554 | 11/1983 | Fed. Rep. of Germany. | |
| 650177 | 2/1951 | United Kingdom | 225/96.5 |

*Primary Examiner*—Hien H. Phan
*Attorney, Agent, or Firm*—Michael D. Bednarek

[57] ABSTRACT

A method and an apparatus for dividing a flat glass panel (14) are described. The panel (14) which is to be divided and which is raised away from its substrate is securely held in its part regions by two clamping devices (10, 12) which are pivoted in opposite directions about a common pivot axle (4) and thus exert on the panel (14) a bending resulting in breakage along the score line (30). Simultaneously exerted on the clamping devices (10) which are, moreover, arranged to be displaceable in the direction of their connection line is a force which presses the clamping devices apart and which at the moment of breakage of the glass panel results in the two part panels moving apart, so that the broken edges cannot strike against one another. The part panels can be deposited again on a substrate after breaking. The invention further provides for marginal strips to be broken off the panel (14) to be divided, in the raised state thereof directly before dividing.

15 Claims, 5 Drawing Sheets

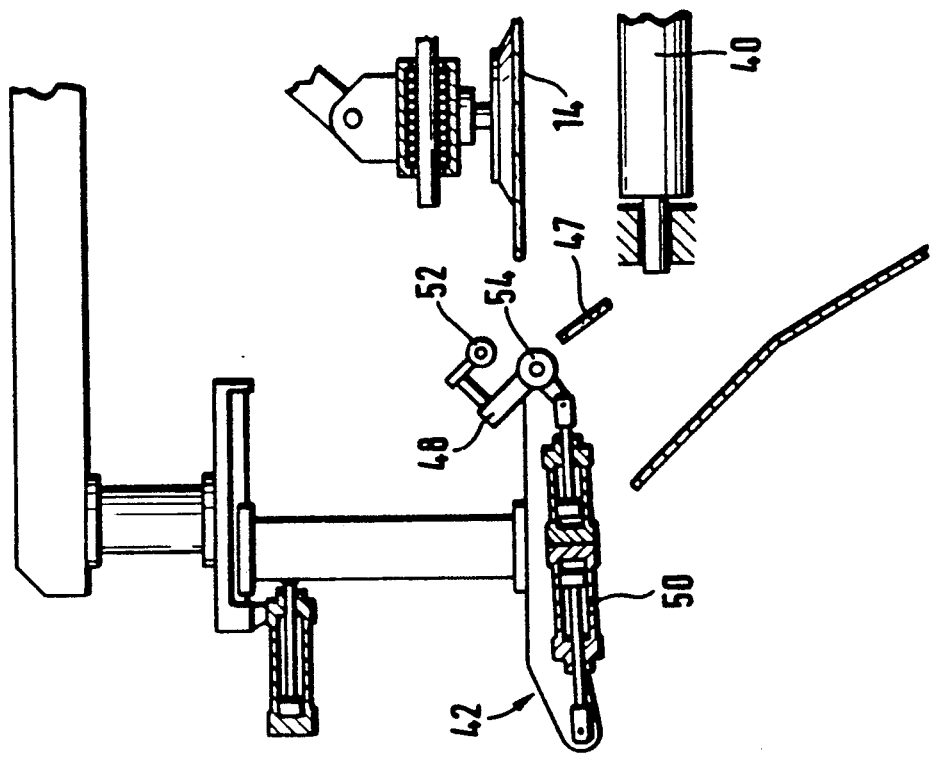
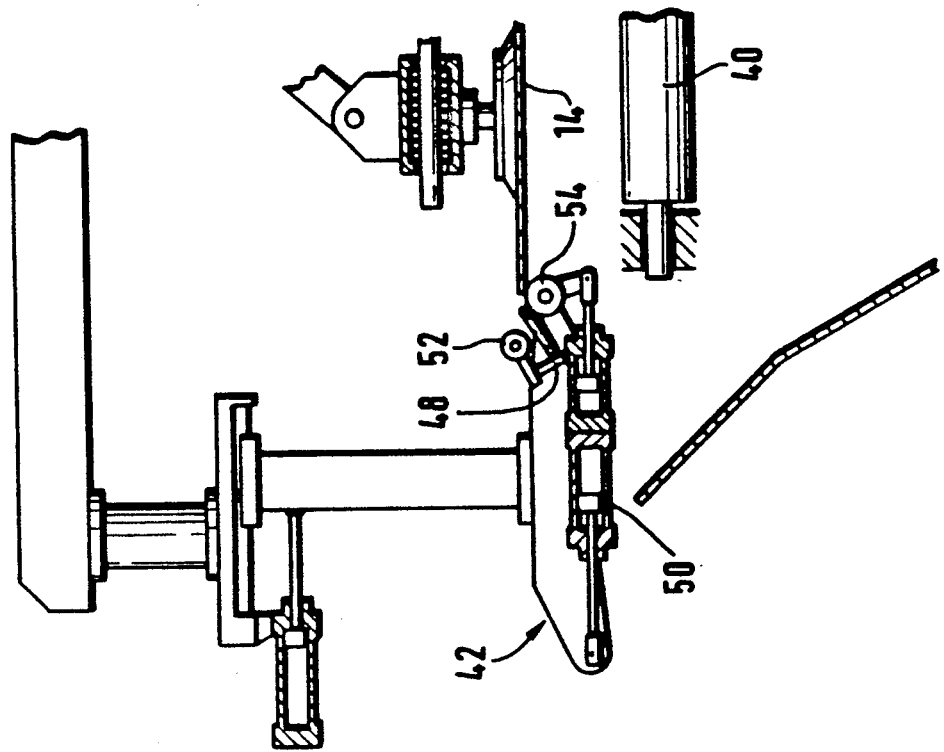

METHOD AND APPARATUS FOR DIVIDING FLAT GLASS PANELS

FIELD OF THE INVENTION

The invention relates to a method of dividing flat glass panels, in which a panel is scored at the intended separation point and then broken along the score line by the action of mechanical force. The invention further relates to an apparatus for carrying out such a method, in particular for integration in a continuous manufacturing process.

BACKGROUND OF THE INVENTION

Within the scope of the present invention, flat glass panels are to be understood to be both panels of glass and panels of glass ceramics which in general have not yet been ceramized and possibly of further materials for which the method described may be used.

In the continuous manufacture or drawing of flat glass, the glass strip, after it has cooled, is scored at predetermined intervals in a direction transverse to the direction of drawing and is broken along the score lines transverse to the direction of drawing to form so-called untrimmed panels. These untrimmed panels still have irregular edges from the drawing process, so that for the lateral straightening of the untrimmed panels marginal strips, so-called rims, also have to be broken off after scoring. Further, the belt width of the drawing plant in general does not correspond exactly to the width for the products to be manufactured, so that the untrimmed panels have to be divided yet again into two or more finished panels after their edges have been straightened.

To this end, the untrimmed panels are removed in accordance with a known procedure from the continuous drawing plant and are subjected to so-called centre breakage in a separate apparatus. To this end, the untrimmed panel was securely clamped by means of one side and a freely projecting part panel was broken off by bending, and then fell onto a conveyor located somewhat lower down in order to be delivered to further processing from there. Here, it is disadvantageous for a continuous production flow that one has to operate here on two planes and that the separated-off part panel has to fall a distance, albeit a small one, after which, moreover, it does not lie back in a strictly horizontal alignment, so that with separated-off part panels there is a risk of breakage. The marginal strips to be separated off and no longer re-usable are generally broken off and disposed of by hand.

The scoring and breaking of glass is a process which is known per se and which functions unproblematically simply with applied bending stress if both or one of the parts to be broken can fall down freely. This applies for example to the marginal strips, which do not need to be held even during breaking and can fall down freely at least for a certain distance directly after breaking off. However, it is more problematic to divide a glass panel into two part panels to be further processed, since they both have to be held securely during the breaking procedure by bending in order to prevent unintentional shattering of a part panel to be re-used. This secure holding of the part panels to be produced results, however, in the edges of the separating point which have become free striking against one another directly after breaking by the application of a bending stress, as a result of which undesired edge chippings are produced.

SUMMARY OF THE INVENTION

The object of the invention is therefore to specify a method of dividing glass panels which prevents these edge chippings and which can be integrated into a continuous flat glass production plant in an appropriate apparatus configuration, in order to carry out the longitudinal division of the untrimmed panels directly in the plant itself and also at the same time to separate off the marginal strips as simultaneously as possible, in which the production speed of the plant is not to be impaired by these breaking procedures.

As far as the method is concerned, a breaking procedure for dividing the untrimmed glass panels as is described by the characterizing features of claim 1 has proved to be suitable for achieving this object. According thereto, the glass panel to be divided is held securely in its two regions which produce the subsequent part panels, on the one hand the two holding devices being turned towards one another in order to exert on the glass panel a bending stress bringing about breakage, but on the other hand the holding devices being acted upon simultaneously by a pressure pre-tension urging them away from one another, which directly during breaking of the glass panel results in the two part panels moving apart, so that there is formed in the region of breakage a gap which prevents the broken edges from mutually striking against one another.

Preferably, this procedure is carried out in a state in which the glass panel to be divided is raised away from its transporting support on which it is passed into the associated apparatus, so that the breakage takes place in the free space, the glass panel being held securely merely by means of the holding devices or clamping means on both sides of the intended breakage line. Suction cups have proved to be very suitable as clamping means, by means of which suction cups the glass panel on the one hand can be raised away from its support and can at the same time as the breaking procedure be held freely in the space.

For an uninterrupted working sequence, it has proved to be advantageous to break off the edges shortly before the glass panel is divided, while it is still in its state raised away from the conveying means. After carrying out all the separating procedures, the part panels obtained are then deposited by means of the suction cups onto the provided transporting support again for further conveyance.

As far as the apparatus is concerned, the object of the invention is achieved in principle by the characterizing features of claim 5.

Here, it is important that the clamping means for the part regions of the glass panel are displaceable approximately in the direction of their connection line relative to one another or relative to frame-mounted apparatus parts. As long as the clamping means, preferably in the form of suction cups, are still in engagement with the undivided glass panel, their displacement relative to one another is not possible, since their positions are in this regard determined by the rigid properties of the glass panel. However, already during the bending of the glass panel initiating the breaking procedure the spacing between the clamping means alters slightly. Even for compensating this alteration in spacing, mutual displaceability of the clamping means is advantageous or important. However, since the clamping means, according to the invention, are still subjected during the breaking procedure to a pre-tension which seeks to push them away from one another, the clamping means move away apart at least for a certain distance directly as the glass panel breaks, so that there is produced between the part panels a gap at the breakage point, as a result of which the broken edges are prevented from striking against one another.

In a preferred embodiment of the apparatus, the clamping means, in the form of suction cups, are arranged displaceably on the free ends, which are substantially flush with one another and point away from one another, of two cantilevers which may be pivoted about a common frame-mounted pivot axle by means of their mounted ends. The force-applying means therefore advantageously comprise a structural component which may be moved by means of an actuating member supported by being frame-mounted in a direction substantially perpendicular to the connection line of the clamping means from the side of the clamping means remote from the suction cups to the frame-mounted pivot axle thereof, the force-applying part being connected in the form of a trapezium to the clamping means by way of obliquely outwardly directed arms. As a result of the mutual approaching movement between the force-applying part and the pivot axle, the arms forming a trapezium try to push the clamping means outwards along their displacement paths away from one another. However, since the clamping means are securely attached to the still undivided glass panel, such a movement is prevented. The approaching movement between the force-applying part and the pivot axle therefore results in the cantilevers, with the clamping means, pivoting in opposite directions, as a result of which a bending eventually resulting in breakage is exerted on the glass panel. At the moment of breakage, the clamping means, however, become free on their displacement paths and are pushed directly away from one another by the force-applying means. The cantilevers bearing the clamping means could be provided in their mutual pivoting movement with a spring pre-tension, so that they move back into their extended position as the glass panel breaks and the part panels are again suspended in a common plane under them.

The frame-mounted supporting of the force-applying means and the frame-mounted mounting of the pivot axle are advantageously both located in an apparatus frame which as such is mounted for its part height-adjustably in a machine chair arrangement, in order to be able to move the clamping means for the glass panel back and forth between a lower position taking up the glass panel from a conveyor and a raised position in which the breaking procedure is carried out.

Where the apparatus is additionally provided with edge-breaking devices, these are advantageously arranged displaceably in the horizontal direction in the machine chair arrangement such that in the raised state of the glass panel they can be moved laterally against the outer edges of the glass panel in order to break off pre-scored marginal strips of the desired width. The edge-breaking devices themselves are provided with a pivot mechanism in order on the one hand to carry out the breaking procedure and on the other hand to deposit the broken-off edge by free fall into a collecting container arranged below the apparatus. The timing control is advantageously such that on the raised glass panel the two lateral edges are broken off first in order then to carry out the division of the glass panel directly thereafter.

The method and apparatus described ar not restricted to the division of an untrimmed panel into only two part panels. On the one hand, part panels produced as a result of division in two can in turn be divided up into further smaller panels in a corresponding manner, but it is also perfectly possible, by means of an appropriate construction of the apparatus, to divide an untrimmed panel up directly for example into three part panels. For this, for example three clamping means provided with suction cups would be possible, which clamping means are matched to one another in corresponding manner in their force-applying and movement sequence by suitable mechanical connection means. Thus, for example the central region of an untrimmed glass panel to be divided into three could remain clamped in stationary manner, while the clamping means for the two outer panels are provided with the appropriate movement possibilities.

BRIEF DESCRIPTION OF THE DRAWINGS

The invention will be described in detail below with reference to the attached drawings, in which:

FIG. 5 illustrates part of the plant according to FIG. 4 during carrying out of the edge breaking, and FIG. 6 illustrates part of the plant according to FIG. 4, in a position for discarding the broken-off edges.

DETAILED DESCRIPTION OF THE DRAWINGS

Figure 1:
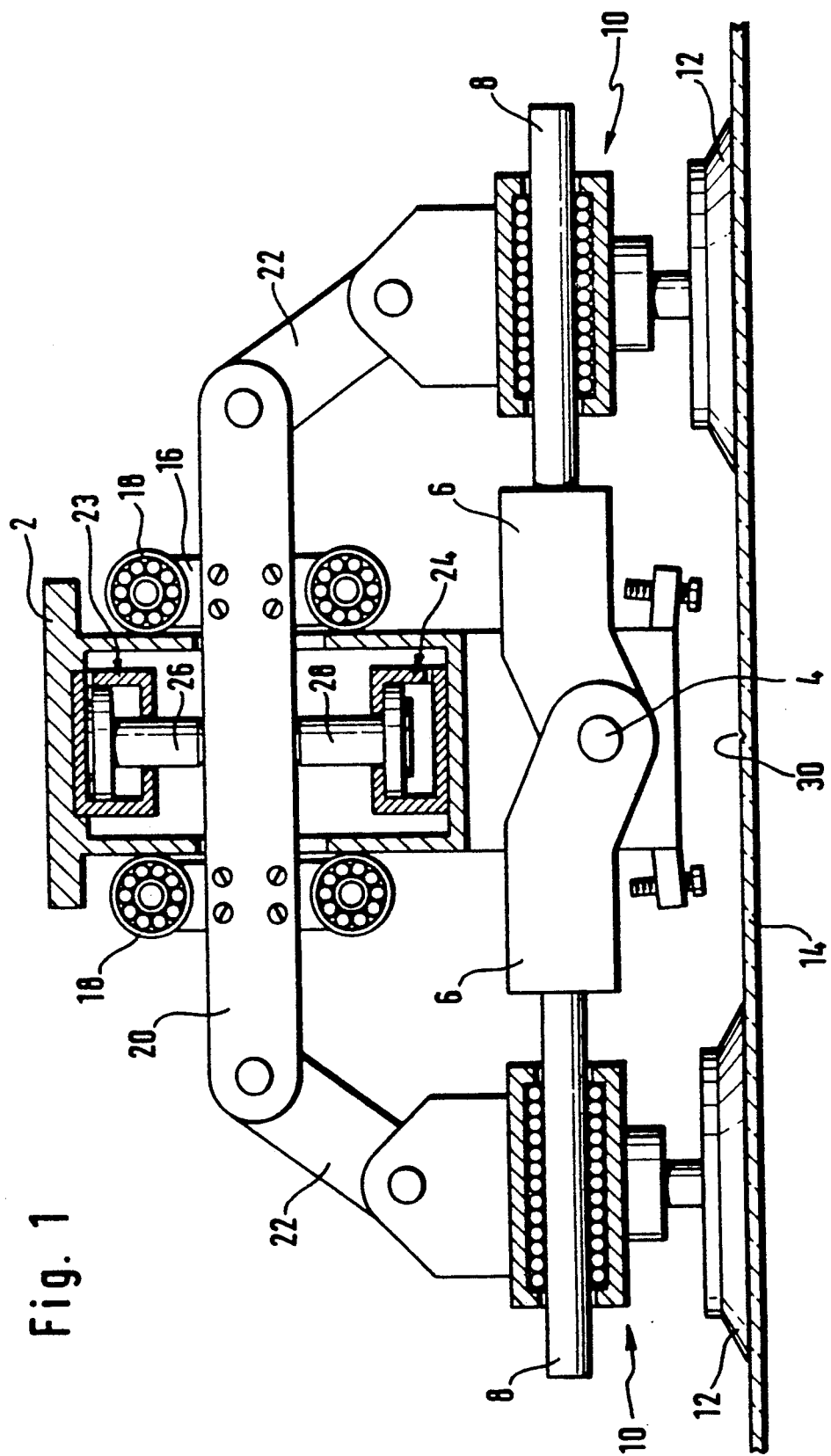
FIG. 1 illustrates an apparatus for dividing a glass panel up into two part panels by breaking, the apparatus holding a glass panel before the initiation of the breaking procedure.

The apparatus according to FIG. 11 has an apparatus frame 2 which is constructed as a type of pillar which with respect to the apparatus illustrated is to be regarded as frame-mounted, apart from the fact that the apparatus as a whole is height-adjustable by means of the pillar, as is described in more detail below. Pivotally mounted about a pivot axle 4 arranged in the lower region of the apparatus frame 2 are two cantilevers 6, on the free ends 8 of which respective glass panel clamping means 10 are substantially horizontally displaceably mounted. The glass panel clamping means 10 each have a suction cup 12 which may be acted upon with a vacuum through lines (not illustrated). The two suction cups 12 hold, in the illustration in FIG. 1, a glass panel 14 in the raised state.

Arranged around the apparatus frame 2 in the upper region is a carriage 16 which may traverse in the vertical direction by means of rollers 18 on the pillar-like apparatus frame. Securely connected to the carriage 16 is a crosspiece 20, whereof the ends are articulatedly connected to the glass panel clamping means 10 by way of obliquely outwardly directed arms 22. Supported in the apparatus frame 2 are two piston-and-cylinder units 23 and 24, whereof the piston rods 26 and 28 act from above or from below on the crosspiece 20 in order to move it upwards or downwards on corresponding actuation of the cylinders together with the carriage 16 on the apparatus frame 2.

Figure 2:
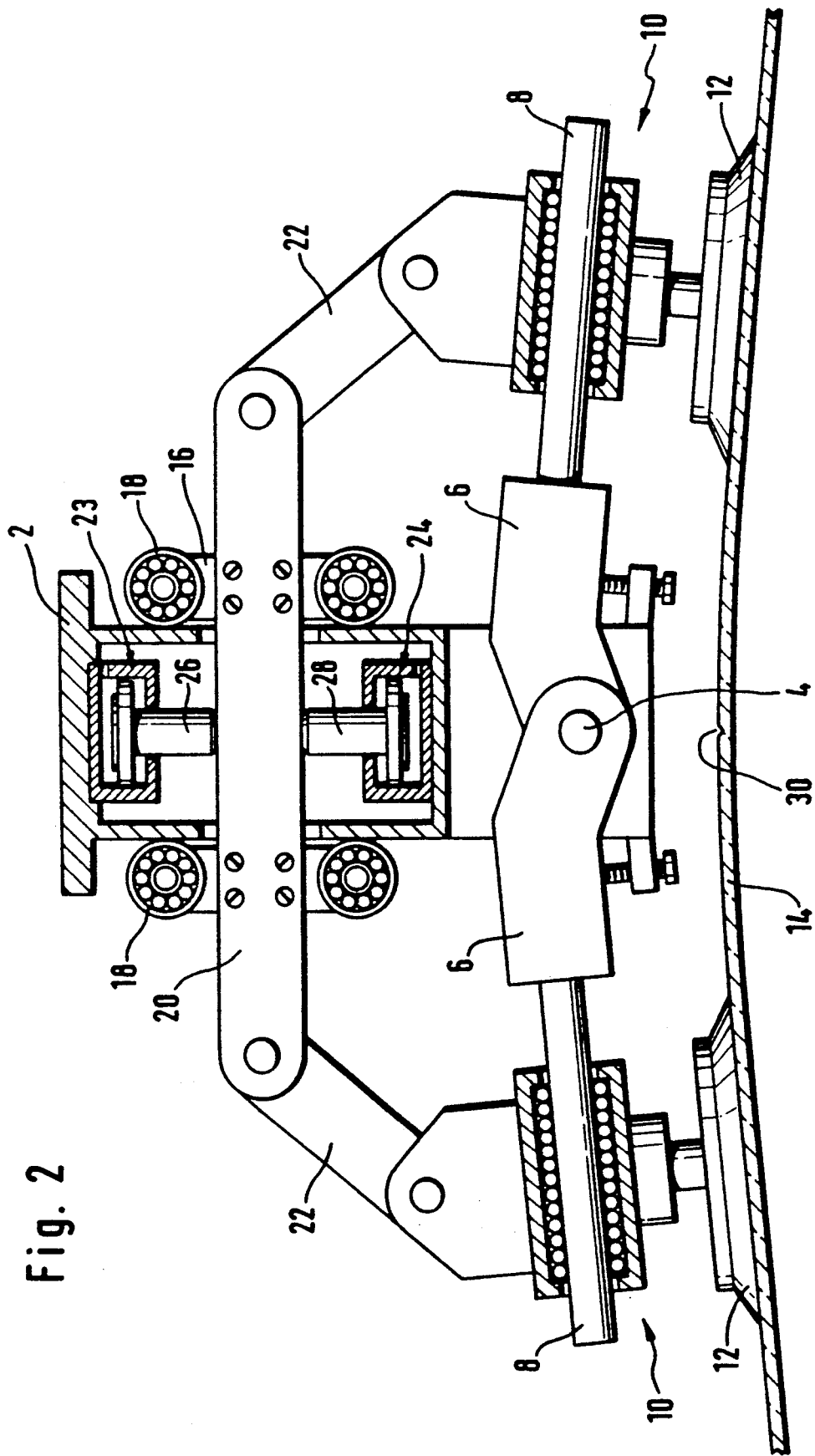
FIG. 2 illustrates the apparatus according to FIG. 1 in a state in which a bending is exerted on the glass panel to be broken.
Figure 3:
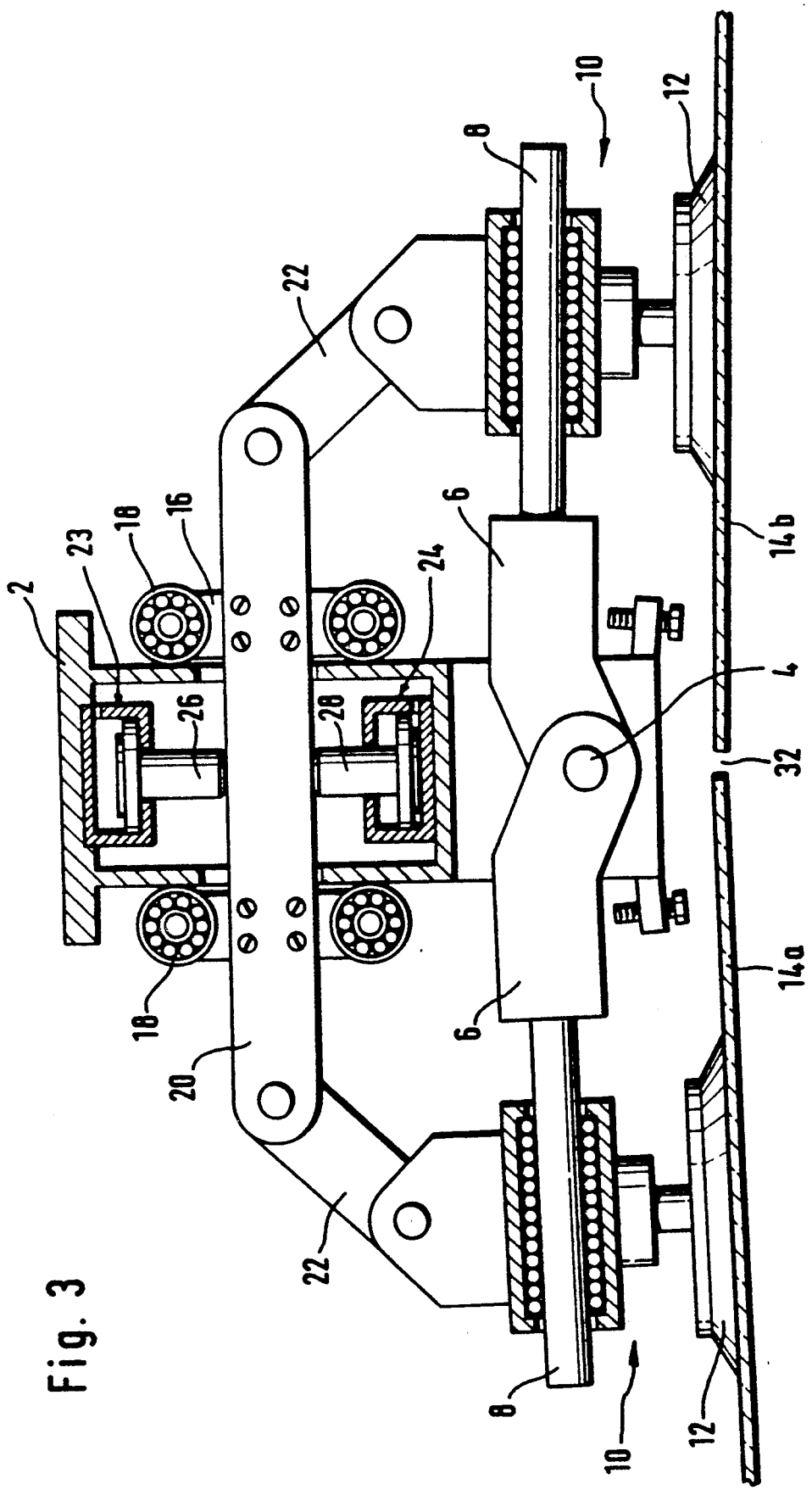
FIG. 3 illustrates the apparatus according to FIG. 1, after the glass panel has been broken.

If, by a suitable action of pressure on the cylinders 23 and 24, the crosspiece 20 is pressed downwards towards the pivot axle 4, then there is exerted on the arms 22 an outwardly directed pressure force which attempts to push the glass panel clamping means 10 on the lever ends 8 outwards. However, if the suction cups 12 are in engagement with a glass panel 14, then this prevents the glass panel clamping means from moving apart. Rather, the glass panel clamping means 10 are pressed downwards by the crosspiece 20 and the arms 22, during which they carry out a slight pivot movement about the pivot axle 4 as a result of their mounting on the levers 6. This results in the glass panel 14 bending, as is illustrated in FIG. 2. On the application of an adequate bending force in this manner, the glass panel 14 will finally break along the score line 30 into two part panels 14a and 14b, as is illustrated in FIG. 3. Because the glass panel clamping means 10 at the moment of breakage are freely displaceable on their lever ends 8, they push apart under the downwardly directed force applied to the crosspiece 20 and at the same time carry the part panels 14a and 14b with them, so that a gap 32 is produced between them at the breakage point. As a result, the broken edges are prevented from striking against one another at the moment of the glass breaking.

By means of restoring means (not illustrated in detail), the lever ends 8 can be returned again to their starting position, so that the part panels 14a and 14b are suspended in horizontal alignment on the suction cups 12 and in this alignment can be deposited again onto a substrate.

Figure 4:
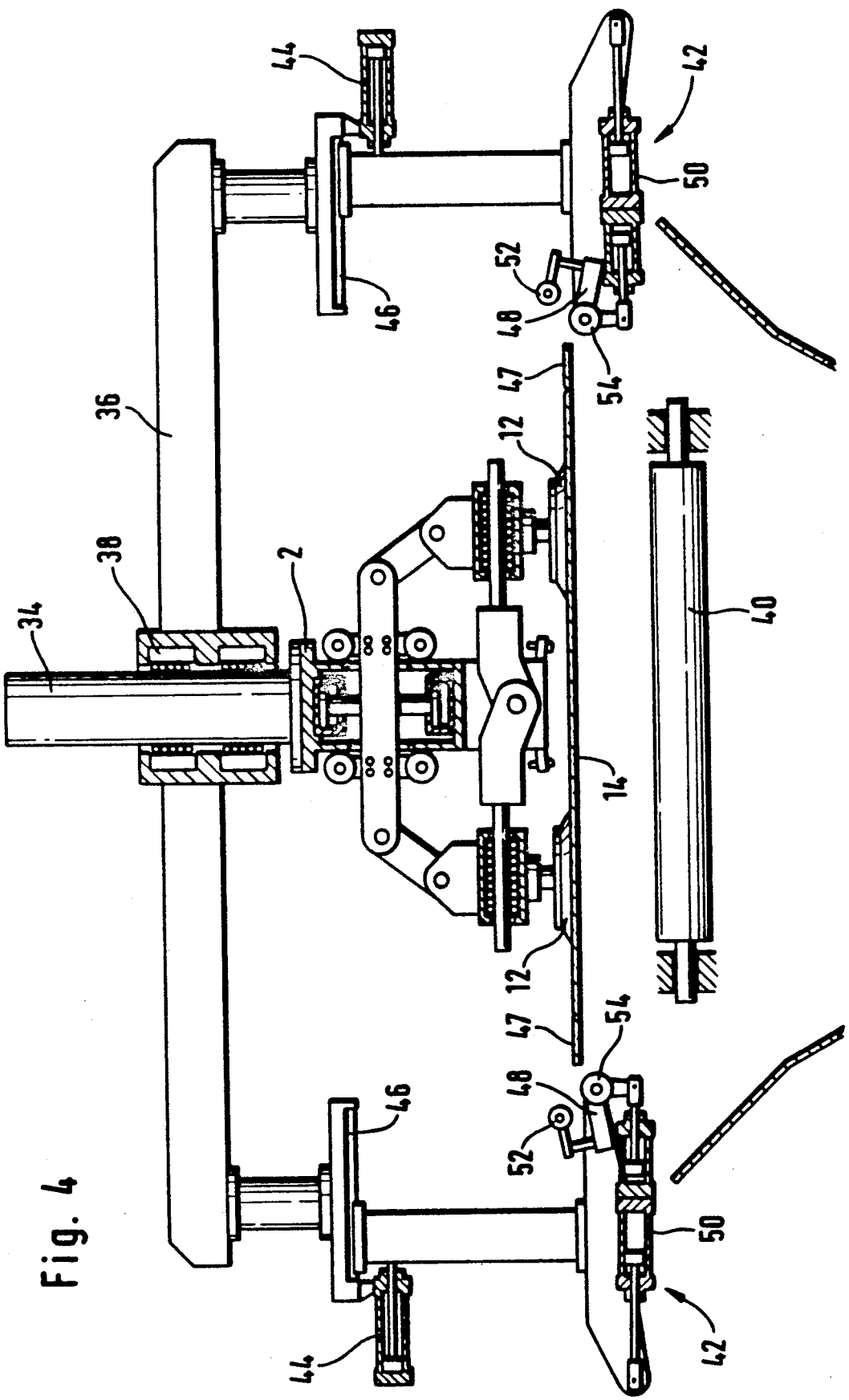
FIG. 4 illustrates a plant for breaking off the edges of a glass panel and for dividing the glass panel, into which for dividing the apparatus according to FIGS. 1-3 is integrated.

FIG. 4 illustrates the apparatus in FIGS. 1-3, as it is secured by the upper end of its apparatus frame 2 to the lower end of a pillar 34 which may be moved to and fro in a machine chair arrangement 36 in guides 38 by means of drive means (not illustrated) between a lower flat glass panel receiving or depositing position and a raised working position for breaking the glass panel. Shown below the apparatus is a roller conveyor 40. If an untrimmed glass panel on this roller conveyor 40 passes into the region of the apparatus, the apparatus is lowered by means of the pillar 34 so that the suction cups 12 can take up the untrimmed glass panel 14 from the conveyor 40. Then, the apparatus is raised into its upper working position, the glass panel 14 being raised away from the roller conveyor 40. In this raised position, breakage of the glass panel 14 is carried out and the part panels produced are then deposited again on the conveyor 40 by lowering the apparatus and aerating the suction cups 12. With an appropriate cycle speed, the apparatus described can be integrated without further measures into the continuous sequence of a flat glass production plant.

As can further be seen in the figure, edge-breaking devices 42 are appended to the machine chair arrangement 36 at the sides. These edge-breaking devices 42 are displaceable in horizontal guides 46 by means of regulating cylinders 44. The edge-breaking devices 42 are arranged in their height such that they can be brought into engagement with the edges 47 of the untrimmed glass panel 14 by horizontally traversing along the guides 46, when the main apparatus for carrying out the centre breakage on the glass panel is in its raised working position in which it holds the glass panel 14 raised away from the conveyor 40. Each of the edge-breaking devices 42 is provided with a breaking tool 48 which is secured pivotally to the breaking device 42 by means of an actuating element 50 and has two spaced breaking rollers 52 and 54 between which the glass edge to be broken off may be introduced such that the lower breaking roller 54 comes to lie exactly below the intended breakage line, while the upper breaking roller is located outwardly offset above the marginal strip to be broken off. By pivoting the breaking tool about the axis of the lower breaking roller 54, the marginal strip is then broken off along a prepared score line. The moment of breaking is illustrated in FIG. 5. When the edge-breaking devices 42 move back horizontally out of the region of engagement with the glass panel 14, after the edges have been broken, the breaking tools 48 can be pivoted in a rotary movement directed in opposition to the breaking procedure, in order to let the marginal strips 47 still held thereby fall into a collecting container arranged below the apparatus. The state of depositing the marginal strips 47 is illustrated in FIG. 6.

The working sequence in the entire apparatus with edge-breaking devices is advantageously effected such that after raising the glass panel 14 away from the conveyor 40 first the edges 47 of the untrimmed glass panel are broken off and the latter is then divided by means of the centre-breaking device directly afterwards, in order then to deposit the part panels again onto the conveyor 40.

What is claimed is:

1. Method of dividing flat glass panels, in which a panel to be divided is scored at the intended separation point and then broken along the score line by the action of mechanical force into two part panels, the method comprising the steps of:
   securely gripping the panel (14) on each side of said score line in the region of each part panel (14a, 14b) by a respective pair of clamping means (10, 12); and
   simultaneously subjecting the glass panel to a bending stress and a tensile stress by pivoting each of the clamping means (10, 12) about a respective pivot axis located between the clamping means and substantially parallel to the score line (30) while exerting a force on said clamping means (10, 12) substantially in the direction of an imaginary connection line between the clamping means;
   wherein said panel is divided into two part panels (14a, 14b) which move apart upon breaking to prevent broken edges of the part panels from striking against one another.

2. Method according to claim 1, further including the steps of:
   rising the panel (14) to be divided from a support (40) after being griped by the clamping means (10, 12); and
   lowering the part panels (14a, 14b) back to the support (40) after said panel is divided.

3. Method according to claim 2, further including the step of breaking off marginal strips (47) from the panel (14) after said panel is raised and before said panel is divided.

4. Method according to claim 1, wherein said step of gripping the panel (14) includes gripping said panel with suction cups (12) as said clamping means.

5. Apparatus for dividing a flat glass panel along at least one prepared score line into at least two part panels, comprising:

at least two glass panel clamping means (10, 12), one each for the at least two part panels, which clamping means are arranged at a spacing from one another and which are arranged to be displaceable from each other substantially in the direction of an imaginary connection line between the clamping means along respective levers which are pivotable at least to a limited extent about frame-mounted pivot axles (4) running perpendicular to said imaginary connection line and generally parallel to the at least one score line;

force applying means (20, 22) which are frame-mounted and which directly act on each of the displaceable and pivotable clamping means (10), said force applying means providing a simultaneous pivoting movement of the clamping means and a displacement force generally in the direction of said imaginary connection line.

6. Apparatus according to claim 5, characterized in that the glass panel clamping means (10) each have one or more suction cups (12).

7. Apparatus according to claim 5, characterized in that the clamping means (10) are displaceably mounted on the free ends (8) of cantilevers (6) which are pivotally mounted by means of their fixed ends about the frame-mounted pivot axle (4).

8. Apparatus according to claim 5, characterized in that the force-applying means (20, 22) have a force-applying structural component (20) movable towards the pivot axle (4) by means of an actuating member (23, 24) supported by being frame-mounted, which force-applying component (20) is connected to the clamping means (10) in the manner of a trapezium by way of two arms (22) directed obliquely outwards from the force-applying component (20) to the respective clamping means.

9. Apparatus according to claim 5, characterized in that the pivot axle (4) and the force-applying means (20, 22) are arranged to be frame-mounted in an apparatus frame (2) which in turn is movable to and fro between a lower flat glass panel receiving or depositing position and a raised working position in a machine chair arrangement (36) over a transporting means (40) for the flat glass panels (14).

10. Apparatus according to claim 9, characterized in that the apparatus frame substantially comprises a pillar (2, 34) which is movable up and down in the machine chair arrangement (36).

11. Apparatus according to claim 10, characterized in that the force-applying means (20) is mounted on a carriage (16) which traverses the pillar (2, 34).

12. Apparatus according to claim 9, characterized in that there are provided on the machine chair arrangement (36) edge-breaking devices (42) which are movable into engagement with outer edges (47) of the flat glass panel (14) to be divided.

13. Apparatus according to claim 5 for dividing a flat glass panel along a single score line into two part panels, comprising two of said glass panel clamping means.

14. An apparatus for dividing a flat panel along a prepared score line into at least two part panels, comprising:

at least a pair of clamping means (10, 12) for gripping said flat panel on each side of said score line;

means for supporting each said clamping means for pivotal movement about a respective pivot axis (4) generally parallel to said score line (30) and for linear movement in a direction of an imaginary connection line between said clamping means; and force applying means (20, 22) for simultaneously providing pivoting movement of the clamping means about said pivot axes (4) while providing a displacement force generally in the direction of said imaginary connection line;

wherein said supporting means comprises a pair of pivotally mounted levers (6, 8) each supporting one of said clamping means (10), respectively, said clamping means each being displaceable along the length of a respective one of sad levers.

15. An apparatus for dividing flat panels according to claim 14, wherein said force applying means comprises a cross-piece (20) mounted between said clamping means for linear movement in a direction perpendicular to a surface of said panel, and a pair of arms (22) extending between a respective end of said cross-piece (20) and a respective clamping means (10), said arms (22) diverging with respect to each other in a direction towards said panel (14).

* * * * *